(12) United States Patent  
Aghssa et al.

(10) Patent No.: US 8,534,748 B1  
(45) Date of Patent: Sep. 17, 2013

(54) SAFETY CROSS-BRACE STRUCTURE FOR VEHICLES

(75) Inventors: Peyman Aghssa, Ann Arbor, MI (US); John Michael McGuckin, Ann Arbor, MI (US); Naeem Ahmed Ghias, Canton, MI (US); Andre Thompson, Bloomfields Hills, MI (US); Neil R. Kauppila, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/532,785

(22) Filed: Jun. 26, 2012

(51) Int. Cl.  
*B62D 25/20* (2006.01)

(52) U.S. Cl.  
USPC .................. 296/187.08; 296/193.07; 280/794

(58) Field of Classification Search  
USPC .................. 296/187.08, 193.02, 193.07, 204; 280/793, 794, 796  
See application file for complete search history.

(56) References Cited

U.S. PATENT DOCUMENTS

| | | | | |
|---|---|---|---|---|
| 1,917,894 A | * | 7/1933 | MacPherson | 180/292 |
| 7,806,467 B2 | * | 10/2010 | Sangu | 296/203.04 |
| 2004/0108754 A1 | * | 6/2004 | Igarashi et al. | 296/204 |
| 2006/0055207 A1 | * | 3/2006 | Reinhardt | 296/193.07 |
| 2008/0231085 A1 | * | 9/2008 | Westing et al. | 296/204 |
| 2012/0306238 A1 | * | 12/2012 | Midoun et al. | 296/204 |

\* cited by examiner

*Primary Examiner* — Jason S Morrow  
(74) *Attorney, Agent, or Firm* — Joseph E. Root

(57) ABSTRACT

A cross-brace structure for a police interceptor SUV includes a front member and a rear member, coupled through a connecting element. The front member has its two ends mounted over the rear floor of the vehicle, and the rear member has a first end and a second end, mounted on the left side rail and the right side rail of the vehicle, respectively. During an impact from the rear side, the crash load gets transferred to the non-impacted rear side through the rear bumper of the vehicle, and eventually, through the left and right rear side rails, towards the rear member of the cross-brace structure. The rear member transfers the crash load towards the front member, and further, towards the front portions of the vehicle, through the front sections of the left side rail and the right side rail.

20 Claims, 3 Drawing Sheets

SAFETY CROSS-BRACE STRUCTURE FOR VEHICLES

BACKGROUND

Many conventional methods and systems are available for protecting vehicles during accidents, by absorbing crash energy during the impacts. Crashworthy systems and devices are now deployed in many vehicles, and these systems and devices help to reduce the severity of injuries as a vehicle experiences an impact. Also, there are different means and methods for ensuring passive safety in vehicles, including airbags, seatbelts and vehicle structure design. Many automobiles also incorporate crumple zones, which are designed to absorb crash energy during impacts, through controlled deformation. These zones manage the crash energy, by absorbing it within the outer parts of a vehicle, thus minimizing the crash energy transfer to the occupants.

'Police Interceptor' is a term coined for police cars, manufactured by different automobile companies. These interceptors are specifically designed and customized according to the needs of police officials. An example of an interceptor is the Crown Victoria police interceptor (CVPI), which is designed for the law enforcement communities in the United States and Canada. In addition, police cruisers manufactured by Ford Motor Company have gained popularity in the North American market, for they have advantageous features for police use, such as, e.g., rear wheel drive and body-on-frame construction.

During an impact from the rear side, most of the impact energy is absorbed by the rear body side rails of a vehicle. To reduce the severity of an impact, the absorbed impact energy needs to be evenly distributed within the vehicle, and eventually dissipated by the vehicle's body structure. For SUVs used as police interceptors, their side rails are normally designed for a speed of 55 miles per hour, with a 70% overlap during rear crash, to comply with the United States Federal Motor Vehicle Safety standards (FMVSS). However, a more significant challenge is to meet a 75 miles per hour 50% offset standard. Managing the crash energy at this high speed, considering the current structure of the SUVs used as police interceptors, while maintaining the crashworthiness of the SUVs, is still a challenge. Therefore, there is a need for a system/mechanism, which can meet the crash testing requirements, under such conditions, as noted above.

SUMMARY

The present disclosure describes a mechanism for maintaining the crashworthiness of a police interceptor SUV during impacts from the rear side, under tough standards for crash testing, specifically, conditions where crash testing is performed at an average speed of about 75 miles per hours, with a 50% offset. The mechanism effectively transfers the crash energy experienced by the vehicle during a rear impact, under these conditions, to the front portions of the vehicle, and eventually, distributes the crash energy uniformly, within the vehicle. Further, the mechanism reduces the severity of impact experienced by the vehicle's rear side rails, and hence, retains the crashworthiness of the vehicle, during rear impacts.

In one aspect, the present disclosure provides a vehicle having a cross-brace structure mounted within the vehicle. The cross brace structure reduces the severity of impacts experienced by the vehicle from the rear side, and uniformly distributes the impact energy within the vehicle. The cross-brace structure includes a first member and a second member. The first member has its ends mounted over a first portion of the vehicle, in a manner spaced apart from each other. The first portion is the rear section of the vehicle's floor. The second member has its first end mounted over a first structural member of the vehicle, and its second end is mounted over a second structural member of the vehicle. The first structural member and the second structural member may be the left side rails and the right side rails of the vehicle, respectively. The two members intersect each other, and the intersecting portions of the two members are coupled to each other through a connecting element. Since the two members are coupled to each other, during a rear impact, the cross-brace structure transfers the absorbed impact energy from one member to the other, and eventually, the absorbed energy is carried towards the front portion of the vehicle, and distributed uniformly within the vehicle.

In another aspect, the present disclosure provides a vehicle having a cross-brace structure mounted within the vehicle. The cross-brace structure includes two front members and two rear members. A first end of each of the two front members is mounted spaced apart from each other, over a first portion of the vehicle. A first end of each of the two rear members is mounted over a first structural member, and a second structural member of the vehicle, respectively. A second end of each of the two front members, and the two rear members, is connected to a connecting element. During an impact from the rear side, the connecting element transfers the experienced impact force from the two rear members to the two front members.

The cross-brace structure maintains the crashworthiness of the vehicle during rear impacts, and transfers the impact energy away from the fuel system, towards the front portions of the vehicle, thus ensuring minimum deformation of the fuel tank. Specifically, during a rear impact, the impact force gets transferred from the impacted rear side to the non-impacted rear side, through the rear bumper of the vehicle. This impact force gets further transferred towards the rear members of the cross-brace structure, through the first and the second structural members. The rear members transfer the impact force to the front members, through the connecting element, and the impact force is transferred by the front members, to the front side rails, and to the other front portions of the vehicle, thus moving the impact force quickly away from the fuel tank of the vehicle during a rear impact.

Additional aspects, advantages, features and objects of the present disclosure would be made apparent from the drawings and the detailed description of the illustrative embodiments construed in conjunction with the appended claims that follow.

BRIEF DESCRIPTION OF THE DRAWINGS

FIG. 1 (B) shows the cross-brace structure of FIG. 1, in a mounted position within a vehicle, in accordance with the present disclosure.

DETAILED DESCRIPTION OF ILLUSTRATIVE EMBODIMENTS

Figure 1A:
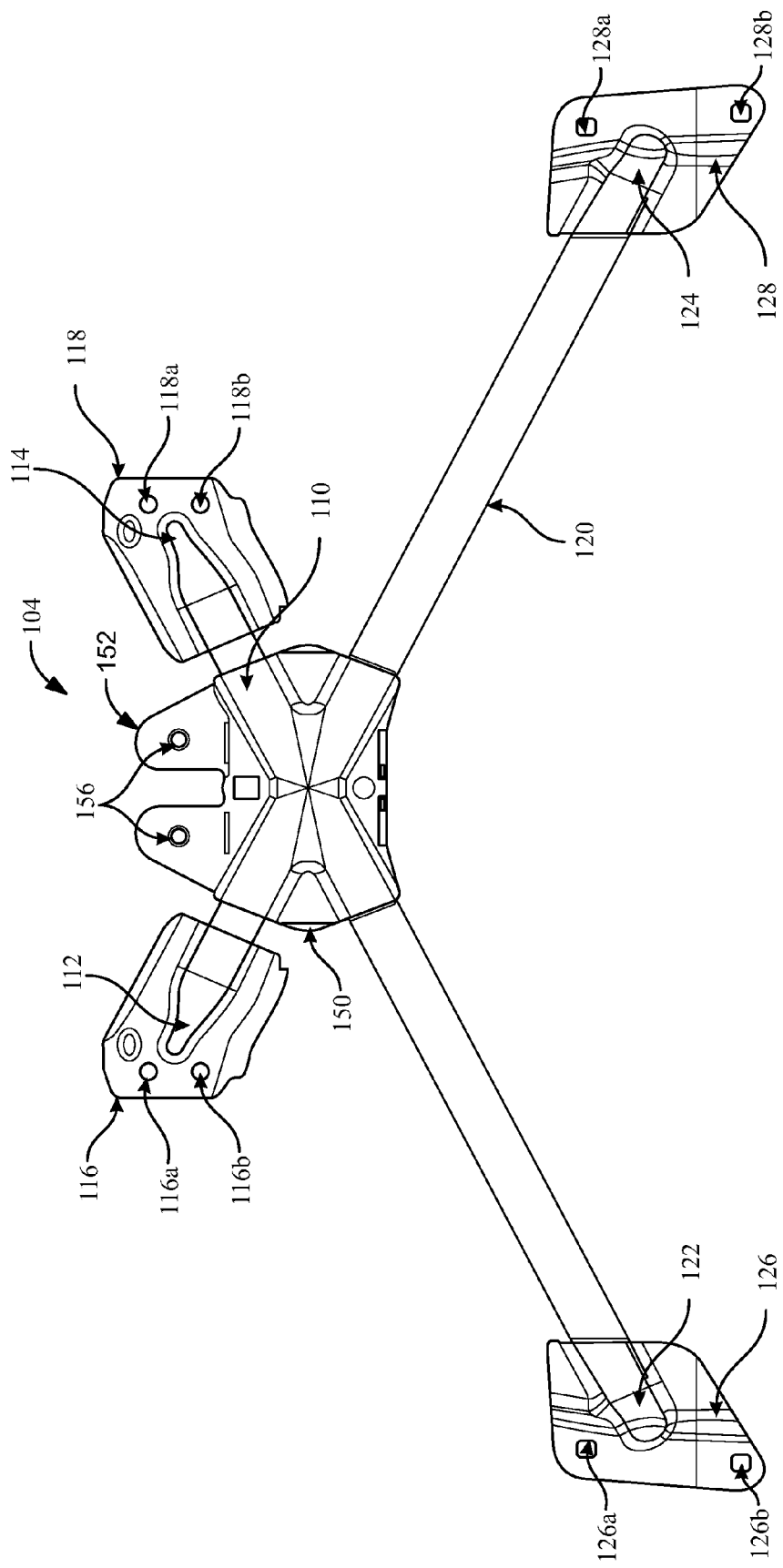
FIG. 1 (A) shows a cross-brace structure mountable within a vehicle, in accordance with the present disclosure.

The following detailed description illustrates aspects of the disclosure and the ways it can be implemented. However, the description does not define or limit the invention, such definition or limitation being solely contained in the claims appended thereto. Although the best mode of carrying out the invention has been disclosed, those in the art would recognize that other embodiments for carrying out or practicing the invention are also possible.

In United States, the National Highway Traffic Safety Administration has set forth a statutory mandate under a chapter within the title 49 of the United States Code, to enforce the Federal Motor Vehicle Safety Standards (FMVSS), which the motor vehicle manufacturers must conform to. Referring to the FMVSS Standard No. 301, it specifies maintenance of fuel system integrity in passenger cars, and multi-purpose passenger vehicles. The enforcement of this standard is meant to reduce the number of deaths and injuries caused to vehicle occupants, due to fire caused by fuel spillage, or due to damages to the fuel system, during motor vehicle crashes. Police interceptors, used by the law enforcement communities of different nations, generally have extremely tough pursuit vehicle requirements. These interceptors are generally tested under stringent conditions, before being ready for use by the police officials. In cases where the interceptors experience an impact from the rear side, most of the impact energy is generally experienced by the rear side rails. Therefore, the rear side rail structure is vulnerable to damages during rear impacts. Generally, the police interceptor SUVs are designed and tested to be appropriate for an impact from a vehicle traveling at an average speed of 55 miles per hour, with a 70% vehicle to vehicle overlap during a rear crash, in order to comply with the standards set under FMVSS 301 for maintaining the fuel system integrity. However, with the existing structure and design of the police interceptor SUVs, it is still a challenge to manage the crash energy during rear impacts, especially when the crash vehicle is traveling at an average speed of about 75 miles per hour, with approximately a 50% offset. The 50% offset criterion refers to the condition when the vehicle colliding from behind, during the rear impact, hits the impacted vehicle within its central line and either of its left or the right extreme edge line, and hence, the considered impacted area is only half or less of the total rear area of the impacted vehicle.

The present disclosure provides a vehicle having a cross-brace structure mounted over its side rails, to maintain the structural rigidity and fuel system integrity of the vehicle during rear impacts, and to retain the vehicle's crashworthiness under high speed rear impacts experienced by the vehicle, specifically, at about 75 miles per hour, with a 50% offset. The cross-brace structure helps to manage the crash energy experienced due to a rear impact, by overcoming the tensile and compressive loads during the rear impact, and distributing the impact energy uniformly within the vehicle.

FIG. 1 (A) shows a cross-brace structure mountable over a vehicle and FIG. 1 (B) shows a top view of the vehicle, with the cross-brace structure of FIG. 1 (A) aligned above its mounting position within the vehicle. Explaining in conjunction with the FIG. 1 (A) and FIG. 1 (B), a vehicle 100 is shown, having the cross brace-structure 104 mounted within it. As shown, the cross-brace structure 104 includes a first member 110 and a second member 120. The first member 110 is a front member, and it has a first end 112 and a second end 114. The two ends 112 and 114 are mounted on the rear floor of the vehicle, in a manner that the ends 112 and 114 are spaced apart from each other. However, the two ends 112 and 114 may also be mounted over any other suitable portion of the vehicle 100, to facilitate distributing the load within the vehicle 100, and to transfer the load partially towards the front portions of the vehicle 100. A pair of extended members 116 and 118 is attached to the two ends 112 and 114 of the first member 110, respectively. The extended members 116 and 118 will be simply referred to as 'member 116' and 'member 118', respectively, hereinafter, for economy of expression. The members 116 and 118 are flanges, and have their surfaces extending from the ends 112 and 114, respectively, to enable mounting of the first member 110 over the rear floor of the vehicle 100. Any suitable means known in the art can be used to attach the members 116 and 118 to the front portion of the vehicle 100. In an embodiment, the members 116 and 118 have multiple perforations to receive fasteners. As shown in FIG. 1 (A), the member 116 has perforations 116 (*a*) and 116 (*b*) to receive a set of fasteners 116 (*c*) (shown in FIG. 1 (B)). The fasteners 116 (*c*) firmly attach the first end 112 (i.e., the left side end) of the first member 110 to a portion of the rear floor of the vehicle 100. Similarly, the member 118 has multiple perforations 118 (*a*) and 118 (*b*) (shown clearly in FIG. 1 (A)), to receiver a set of bolts 118 (*c*) (FIG. 1 (B)). The bolts 118 (*c*) fix the member 118 over another suitable portion of the rear floor of the vehicle 100, spaced apart from the portion of the vehicle 100 where the first end 112 is attached. As noted above, other appropriate conventional ways can also be employed to attach the members 116 and 118 to the front portion of the vehicle 100. As an example, the members 116 and 118 can also be welded, soldered or brazed to the rear floor of the vehicle 100. The exact point of attachment of the members 116 and 118 on the vehicle 100, as depicted in the FIG. 1 (B), is not intended to limit the scope of the present disclosure. Specifically, in certain embodiments, the points of the attachment of the members 116 and 118, to the rear floor of the vehicle 100, may also be less or more spaced apart from each other.

Figure 1B:
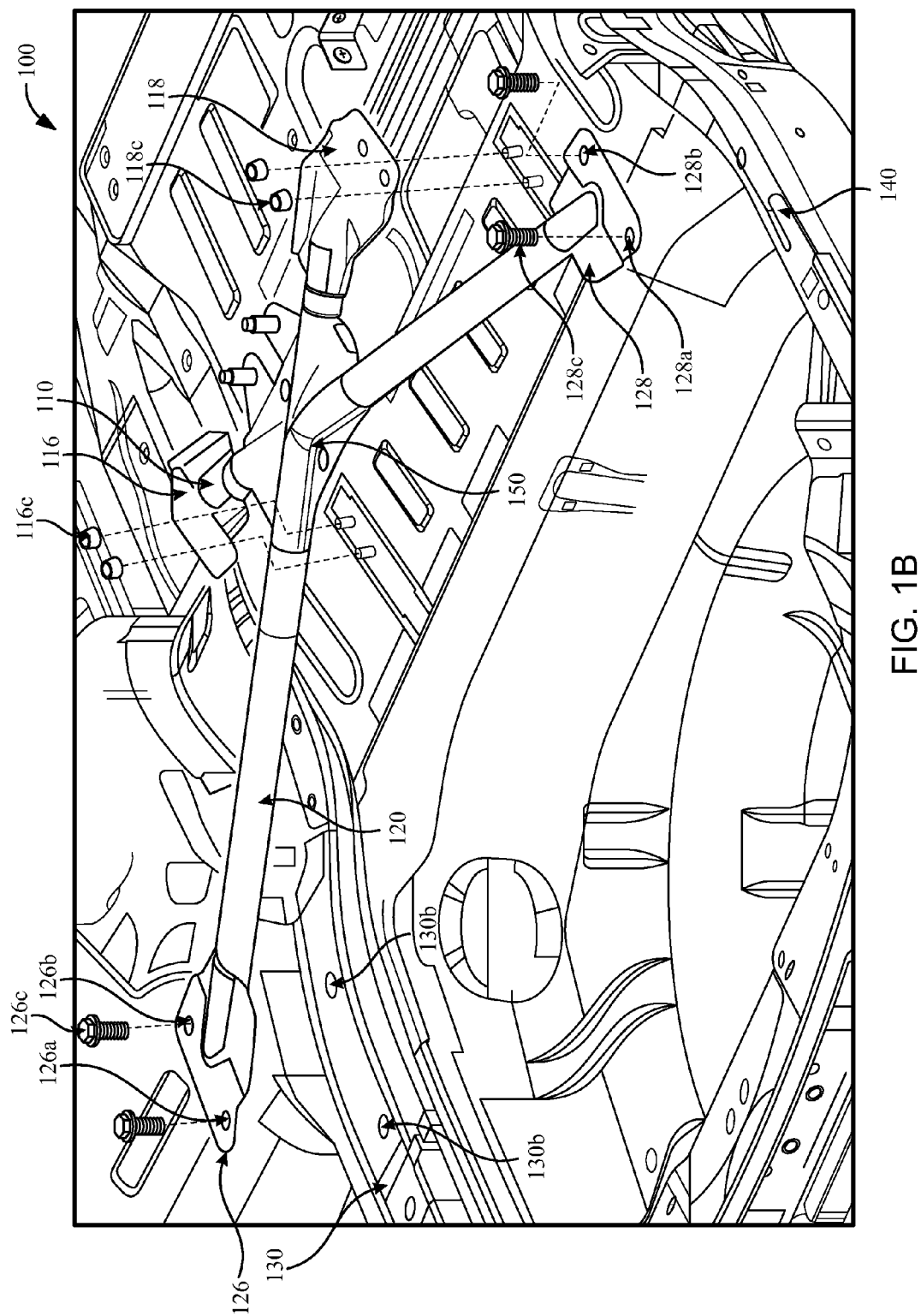

The cross-brace structure 104 also includes a second member 120. The second member 120 is a rear member. As shown in FIG. 1 (A), the second member 120 includes a first end 122 and a second end 124. The first end 122 is attached to the rear portion of the left side rail 130 (as shown in FIG. 1(B)), and the second end 124 is attached to the rear portion of the right side rail 140. As shown, the second member 120 also has a pair of extended members 126 and 128, attached to its first end 122 and the second end 124, respectively. The extended members 126 and 128 are flanges, and are fixedly attached to the left rear side rail 130 and the right rear side rail 140, respectively. In a similar manner as noted above for the first member 110, any suitable conventional means can be used to attach the extended members 126 and 128 to the side rails of the vehicle 100. In an embodiment, as shown in FIG. 1 (B), the extended member 126 has perforations 126 (*a*) and 126 (*b*) to receive a set of bolts 126 (*c*). The bolts 126 (*c*) fixedly attach the extended member 126 to the left rear side rail 130. To enable the attachment through the bolts 126 (*c*), different threaded slots 130 (*b*) are provided on the rear portion of the left side rail 130, which receive the bolts 126 (*c*). However, as noted above, in some embodiments, the extended member 126 can also be welded, soldered or brazed to the rear portion of the left side rail 130. Similarly, the extended member 128 is fixedly attached to the rear portion of the right side rail 140, by bolting it to the right side rail 140, through a number of bolts 128 (*c*), as shown in FIG. 1 (B). Multiple perforations 128 (*a*) and 128 (*b*) are provided within the extended member 128, to receive the bolts 128 (*c*).

The material preferably used for manufacturing the first member 112 and the second member 114 is High Strength Low Alloy steel (HSLA steel), for ensuring high strength and greater resistance to corrosion and formability of the two members 112 and 114. Further, high strength low alloy steel ensures the effectiveness of the two members 112 and 114 in transferring the load from the second member 114 to the first member 114, and eventually towards the front portions of the vehicle, without any deformation experienced by any of the two members 112 or 114, during a rear impact due to a crash vehicle travelling at high speeds of about 75 miles per hour or more. Further, the material used for manufacturing the first member 112 and the second member 114, has a sufficiently high yield strength, to absorb the compressive or tensile loads experienced by the vehicle 100 during a rear impact, without causing yielding or deformation of the two members 112 and 114. However, the alloy used for manufacturing the two members 112 and 114, is not intended to limit the scope of the present disclosure, and those in the art will understand that other suitable substitutive materials can also be used for manufacturing the two members 112 and 114, including conventional carbon steel alloys used for such purposes.

As shown in FIG. 1 (A), the two members 110 and 120 of the cross-brace structure 104 intersect each other. A connecting element 150 is provided at the central portion of the cross-brace structure 104, which binds the intersecting portions of the first member 110 and the second member 120. The connecting element 150 includes a pair of plates, specifically, plate 152, and plate 154 (hidden below plate 154). The plate 152 overlays the plate 154 in the assembled configuration of the connecting element 150. The two plates 152 and 154 are provided with a number of openings 156 within their flat portions non-overlapping with the portions of the first member 110 and the second member 120. The openings 156 receive a set of bolts (though not shown), which fixedly attach the plate 152 to the plate 154. As the two plates are fixedly attached to each other, and incorporate the intersecting portions of the first member 110 and the second member 120, the connecting element 150 keeps the first member 110 coupled to the second member 120 at all points of time, in the mounted position of the cross-brace structure 104. Further, certain portions of the top plate 152 are curved upwards, as shown, to facilitate proper positioning of the plate 152 over protruding portions of the first member 110 and the second member 120 (i.e., over the portions of the first member 110 and the second member that are curved upwards). The exact shape and curvature of such upwardly curved portions of the plate 152 depends upon shape of the intersecting portions of the first member 110 and the second member 120. Preforming the plate 152 by casting it in a mold is well known to those in the art. Similarly, the bottom plate 154 is adaptively shaped to incorporate and fit into the bottom sections of the intersecting portions of the first member 110 and the second member 120. Though not shown, certain portions of the bottom plate 154 are downwardly curved, to incorporate the sections of the intersecting portions of the first member 110 and the second member 120 that protrude downwards. Further, though bolting of the two plates to each other is preferred, the top plate 152 and the bottom plate 154 can also be welded to the intersecting portions of the first member 110 and the second member 120, to enable coupling of the first member 110 to the second member 120. In an embodiment, a consolidated piece can also be used to serve the purpose of the connecting element 150, thus replacing the separate plates 152 and 154. In those embodiments, such a piece can be welded to the interesting portions of the first member 110 and the second member 120.

In other embodiments (not shown), other means for connecting the first member and the second member can be used. For example, the first member and the second can be riveted directly to each other.

The connecting element 150, and hence its top plate 152 and the bottom plate 154, are uniformly composed of high-strength low alloy steel (HSLA 300), having an average yield strength in the range 250-600 MPa. The HSLA material provides the desired mechanical properties, including higher strength, greater resistance to corrosion, formability and weldability. However, those in the art will understand that other suitable substitutive materials can also be used for manufacturing the connecting element 150, including conventional carbon steel alloys, thus, not limiting the scope of the disclosure. The alloy used for manufacturing the connecting element 150 depends upon different design criteria, including the average load experienced by the vehicle during high speed rear impacts.

In an embodiment, the first member 110 (i.e. the front member) of the cross-brace structure 104 is constituted by two separate front members joined to each other through the connecting element 150. In that embodiment, a first end of each of those two front members is attached to the rear floor of the vehicle 100, in a manner that the points of attachment of the first ends of the two front members are spaced apart from each other. A second end of each of those two front members is connected to the connecting element 150. Appropriate means for connecting the second ends of the two front members to the connecting element 150, can be bolting, welding, soldering, etc. Similarly, the second member 120 (i.e., the rear member) is constituted by two separate rear members joined to each other through the connecting element 150. A first end of each of the two rear members is attached to the left rear side rail 130, and the right rear side rail 140, of the vehicle 100, respectively. A second end of each of the two rear members is attached to the connecting element 150, by suitable means like bolting, welding, soldering or brazing, etc. The two front members and the two rear members are substantially tubular in their cross section, along their portions intercepted between their two ends. However, the two front members and the two rear members can be of any other suitable shape too, between their two ends, i.e., the end attached to the front portion of the vehicle (for the front members) or to the left/right rear side rail of the vehicle (for the rear members), and the end connected to the connecting element 150, to effectively facilitate the transferring of load from the rear members to the front members, during a rear impact.

Figure 2:
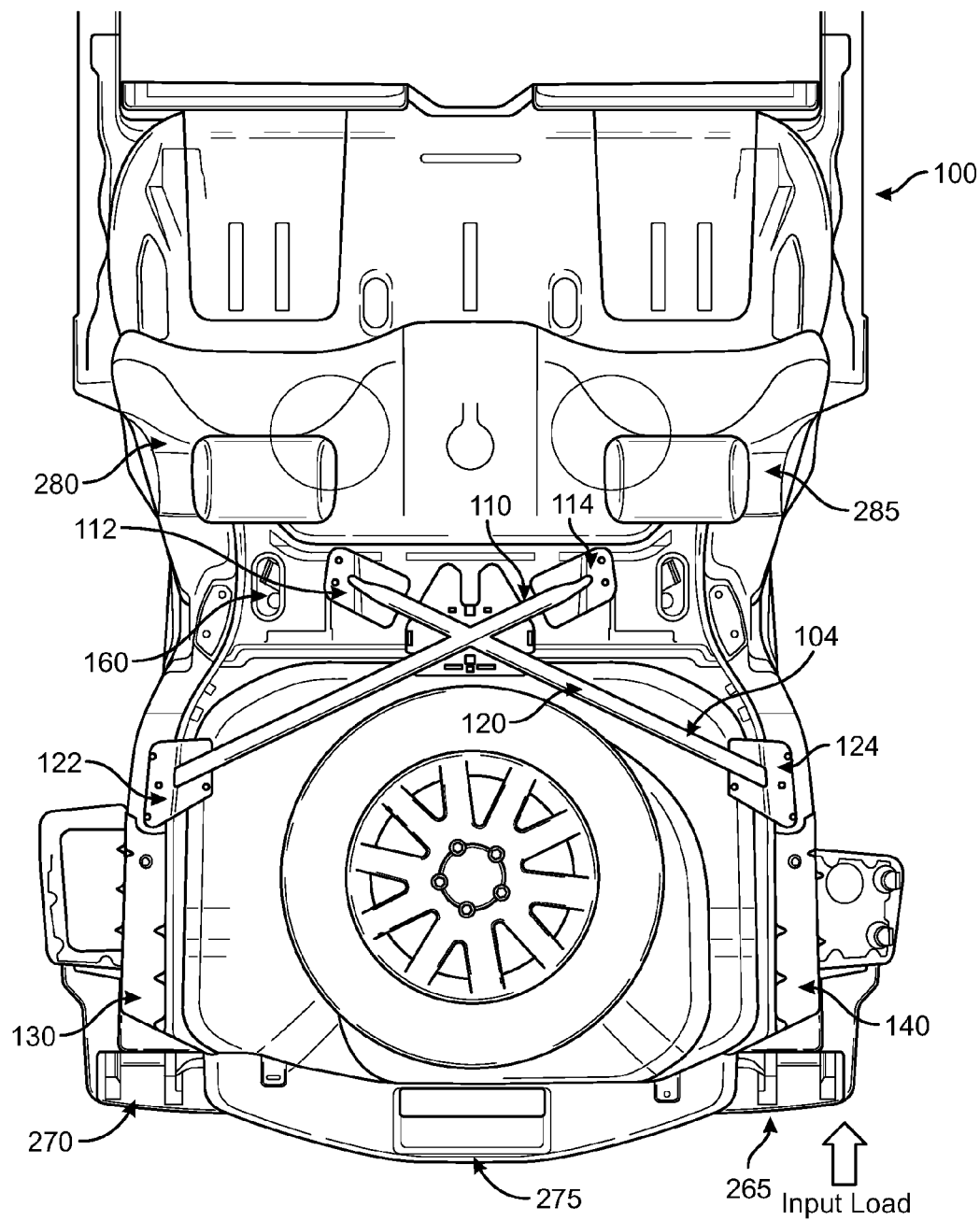
FIG. 2 shows a top view of a vehicle, with the cross-brace structure of the present disclosure mounted within it.

FIG. 2 shows the top view of a vehicle, with the cross-brace structure of the present disclosure mounted within it. As shown, a vehicle 100, with a cross-brace structure 104, is positioned within it. Specifically, as aforementioned, and as shown herein, the cross-brace structure has a front member 110 and a second member 120, and the two members are connected to each other, and coupled, through a central connecting element 150. The front member 110 has a first end 112 and a second end 114, both ends being mounted on the rear floor of the vehicle 100. The rear member 120 has a first end 122 mounted over the left rear side rail 130, and a second end 124 mounted over the right rear side rail 140 of the vehicle 100. The front member 110 and the rear member 120 have substantially tubular cross-section between their ends. The way the cross-brace structure 104 transfers the load experienced by the vehicle 100 during a rear impact, and the path through which the load gets distributed to the front portions of the vehicle 100, is now explained. In an embodiment, if an impact is experienced by the vehicle 100 along the rear portion 265, then a fraction of the crash load gets transferred to the non-impacted rear side 270, along the rear bumper beam 275. From the impacted rear portion 265, partially, and from the non-impacted rear side 270, partially, the load gets transferred through the right side rail 140, and through the left side rail 130, respectively, towards the rear member 120 of the cross-brace structure 104. From there, the cross-brace structure 104, with its front member 110 bolted to the rear floor of the vehicle, captures the crash load, and shifts the load to the front portion 280 of the non-impacted left side rail 130, to the front portion 285 of the impacted side rail 140, and eventually, to the other front portions of the vehicle 100. Further, the transferred crash load is taken by the underbody cross-members, the front portions of the two side rails, and the side sill structure of the vehicle 100, and this transfers the impact energy substantially away from the fuel tank. Due to this, the fuel tank and the fuel system experience minimal deformation, even under high speed rear impact, specifically, impacts due to a crash vehicle travelling at or above speeds of about 75 miles per hour. Further, the cross-brace structure 104 effectively reduces the immediate crash load experienced by the rear portion of the vehicle 100, during a rear impact, by transferring the crash load to the front portions, and hence reduces the severity of rear impact.

Even though the cross-brace structure of the present disclosure is described to be usable in police interceptor SUVs, used by the law enforcement community of the different nations, however, the described implementation should be construed as one exemplary implementation of the cross-brace structure, and is not intended to limit the application of the cross-brace structure. Specifically, the present disclosure's cross-brace structure can also be used in many other vehicles including cars, and other different kinds of sports utility vehicles except the interceptor SUV, etc.

Although the current invention has been described comprehensively, in considerable details to cover the possible aspects and embodiments, those skilled in the art would recognize that other versions of the invention are also possible.

What is claimed is:

1. A vehicle having a cross-brace structure mounted within the vehicle, the structure comprising:
    a first member and a second member, the first member having a first end and a second end, the two ends of the first member being mounted on a portion of the floor of the vehicle located between a first structural member and a second structural member of the vehicle, the second member having a first end thereof mounted over the first structural member, and a second end thereof mounted over the second structural member of the vehicle, the first member and the second member intersecting each other, wherein:
        the intersecting portions of the first member and the second member are coupled to each other through a connecting element, the connecting element being configured to transfer the load experienced by the vehicle during an impact, from one member to the other.

2. The vehicle of claim 1, wherein the first structural member is the left side rail of the vehicle, and the second structural member is the right side rail of the vehicle.

3. The vehicle of claim 1, wherein the first member and the second member have a substantially elongate tubular structure between their ends and intersecting portions.

4. The vehicle of claim 1, wherein the points of attachment of the two ends of the first member, to the portion of the floor of the vehicle located between the first and the second structural members, are spaced apart from each other.

5. The vehicle of claim 1, wherein the intersecting portions of the first member and the second member are substantially arcuate, and curved oppositely with respect to each other.

6. The vehicle of claim 1, wherein the first member and the second member have extended members connected to each of their ends, to enable mounting of the two members within the vehicle.

7. The vehicle of claim 6, wherein the extended members are flanges.

8. The vehicle of claim 6, wherein the extended members have one or more openings configured to receive fasteners, the fasteners being configured to fixedly attach the ends of the two members to the vehicle.

9. The vehicle of claim 8, wherein the portion of the floor of the vehicle, the first structural member, and the second structural member, have multiple openings configured to receive the fasteners.

10. The vehicle of claim 1, wherein the ends of the first and the second member are soldered, brazed, welded or bolted to the portion of the floor of the vehicle located between the first and the second structural member.

11. The vehicle of claim 1, wherein the first member and the second member have average lengths spanned between their two ends, the average length of the first member being smaller than the average length of the second member.

12. The vehicle of claim 1, wherein the connecting element of the cross-brace structure includes a first plate and a second plate overlaying the first plate, the two plates being connected in a manner to incorporate and structurally bind the intersecting portions of the two members.

13. The vehicle of claim 1, wherein the connecting element includes openings configured to receive fasteners, the fasteners being configured to fixedly attach the connecting element to the intersecting portions of the first member and the second member.

14. The vehicle of claim 1, wherein the connecting element of the cross-brace structure is welded, soldered, brazed or bolted to the intersecting portions of the first member and the second member.

15. The vehicle of claim 1, wherein the cross-brace structure is substantially X-shaped, and configured to transfer impact energy, during a rear impact experienced by the vehicle, from the second member to the first member.

16. The vehicle of claim 1, and substantially composed of high-strength low-alloy steel.

17. The vehicle having a cross-brace structure mounted within the vehicle, the structure comprising:
    two front members, each having a first end thereof mounted spaced apart from each other over a portion of the floor of the vehicle located between a first structural member and a second structural member of the vehicle;
    two rear members, each having a first end thereof mounted over the first structural member and the second structural member of the vehicle, respectively, wherein:
        the two front members and the two rear members are coupled to each other through a connecting element, and a second end of each of the two front members and the two rear members is connected to the connecting element, the connecting element being configured to transfer the force experienced by the vehicle during a rear impact, from the rear members to the front members.

18. The vehicle of claim 17, wherein the first structural member is the left side rail, and the second structural member is the right side rail of the vehicle.

19. The vehicle of claim 17, wherein the first ends of the two front members and the two rear members, are mounted by one of a group consisting of bolting, soldering, brazing and welding.

20. The vehicle of claim 17, wherein the connecting element is attached to the second end of each of the two front members and the two rear members, by bolting, soldering, welding or brazing.

* * * * *